(12) United States Patent
Cheim et al.

(10) Patent No.: US 10,310,453 B2
(45) Date of Patent: Jun. 4, 2019

(54) DYNAMIC ASSESSMENT SYSTEM FOR HIGH-VOLTAGE ELECTRICAL COMPONENTS

(75) Inventors: Luiz V. Cheim, St. Charles, MO (US); Pierre Lorin, Granois (CH)

(73) Assignee: ABB Schweiz AG, Baden (CH)

( * ) Notice: Subject to any disclaimer, the term of this patent is extended or adjusted under 35 U.S.C. 154(b) by 660 days.

(21) Appl. No.: 14/110,997

(22) PCT Filed: Apr. 13, 2012

(86) PCT No.: PCT/US2012/033433
§ 371 (c)(1),
(2), (4) Date: Oct. 10, 2013

(87) PCT Pub. No.: WO2012/142355
PCT Pub. Date: Oct. 18, 2012

(65) Prior Publication Data
US 2014/0025211 A1    Jan. 23, 2014

Related U.S. Application Data

(60) Provisional application No. 61/475,852, filed on Apr. 15, 2011.

(51) Int. Cl.
*G05B 13/02* (2006.01)
*H02J 13/00* (2006.01)
*G05B 23/02* (2006.01)

(52) U.S. Cl.
CPC ......... *G05B 13/02* (2013.01); *G05B 23/0229* (2013.01); *G05B 23/0272* (2013.01);
(Continued)

(58) Field of Classification Search
CPC .... G05B 15/00; G05B 13/02; G05B 23/0229; G05B 23/072; G05B 23/0286;
(Continued)

(56) References Cited

U.S. PATENT DOCUMENTS 4,654,806 A * 3/1987 Poyser ................. H02H 7/04
                                                          324/726
2002/0161558 A1* 10/2002 Georges ............. G05B 23/0264
                                                          702/189
(Continued)

FOREIGN PATENT DOCUMENTS

CN      1110838 A    * 10/1995
CN      2824146 Y      10/2006 ........... G06F 15/163
(Continued)

OTHER PUBLICATIONS

IEEE on "A Transformer Condition Assessment Framework Based on Data Mining", Published in 2005, by: Yongli Zhu, Lizeng Wu, Xueyu Li, Jinsha Yuan.*
(Continued)

*Primary Examiner* — Robert E Fennema
*Assistant Examiner* — Jigneshkumar C Patel
(74) *Attorney, Agent, or Firm* — Taft Stettinius & Hollister LLP; J. Bruce Schelkopf

(57) ABSTRACT

A dynamic assessment system for monitoring high-voltage electrical components, which includes a computer system that is configured to receive data from a plurality of on-line sensors configured to monitor various operating parameters associated with the operation of a plurality of electrical components such as a plurality of electrical transformers. The computer system is configured to automatically and continuously correlate the data from the on-line sensors with data from various off-line databases and supervisory networks associated with monitoring the operation of the power distribution network, so as to generate dynamic operating condition assessments, including risk of failure assessments, of each of the monitored electrical components.

10 Claims, 1 Drawing Sheet

(52) U.S. Cl.
CPC ...... *G05B 23/0286* (2013.01); *H02J 13/0006* (2013.01); *G05B 2219/24215* (2013.01); *Y02E 60/74* (2013.01); *Y04S 10/30* (2013.01); *Y04S 10/522* (2013.01)

(58) Field of Classification Search
CPC . G05B 2219/24215; G06Q 50/06; H02J 3/00; H02J 13/0086; H02J 13/0006; Y02E 60/74; Y04S 10/30
USPC ....................................................... 700/286
See application file for complete search history.

(56) References Cited

U.S. PATENT DOCUMENTS

| | | | |
|---|---|---|---|
| 2003/0028268 A1 | 2/2003 | Eryurek et al. | 700/73 |
| 2003/0139891 A1* | 7/2003 | Coffeen | G01R 31/027 |
| | | | 702/108 |
| 2006/0259277 A1 | 11/2006 | Fantana et al. | 702/183 |
| 2007/0286089 A1* | 12/2007 | Nasle | G06F 17/5009 |
| | | | 370/245 |
| 2009/0112375 A1 | 4/2009 | Popescu | 700/292 |
| 2009/0204266 A1 | 8/2009 | Lovmand et al. | 700/287 |
| 2011/0213744 A1* | 9/2011 | Sparling | G05B 23/0227 |
| | | | 706/46 |
| 2012/0022713 A1* | 1/2012 | Deaver, Sr. | G05B 17/02 |
| | | | 700/298 |

FOREIGN PATENT DOCUMENTS

| | | | | |
|---|---|---|---|---|
| CN | 101451982 A * | 6/2009 | | |
| WO | WO 2009/079395 A1 | 6/2009 | ............. | G06F 11/30 |

OTHER PUBLICATIONS

Office Action dated Jun. 26, 2015 in corresponding Chinese application No. 201280025268X.
Search Report dated Jun. 26, 2015 with Office Action in corresponding Chinese application No. 201280025268X.
*Reducing Grade Change Time Through the Use of Predictive Multi-Variable Control*; McQuillin et al.; Control Systems; 1994; Stockholm, Sweden; pp. 275-281.
International Search Report from corresponding application No. PCT/US2012/033433 dated Aug. 24, 2012.
Written Opinion from corresponding application No. PCT/US2012/033433 dated Aug. 24, 2012.

* cited by examiner

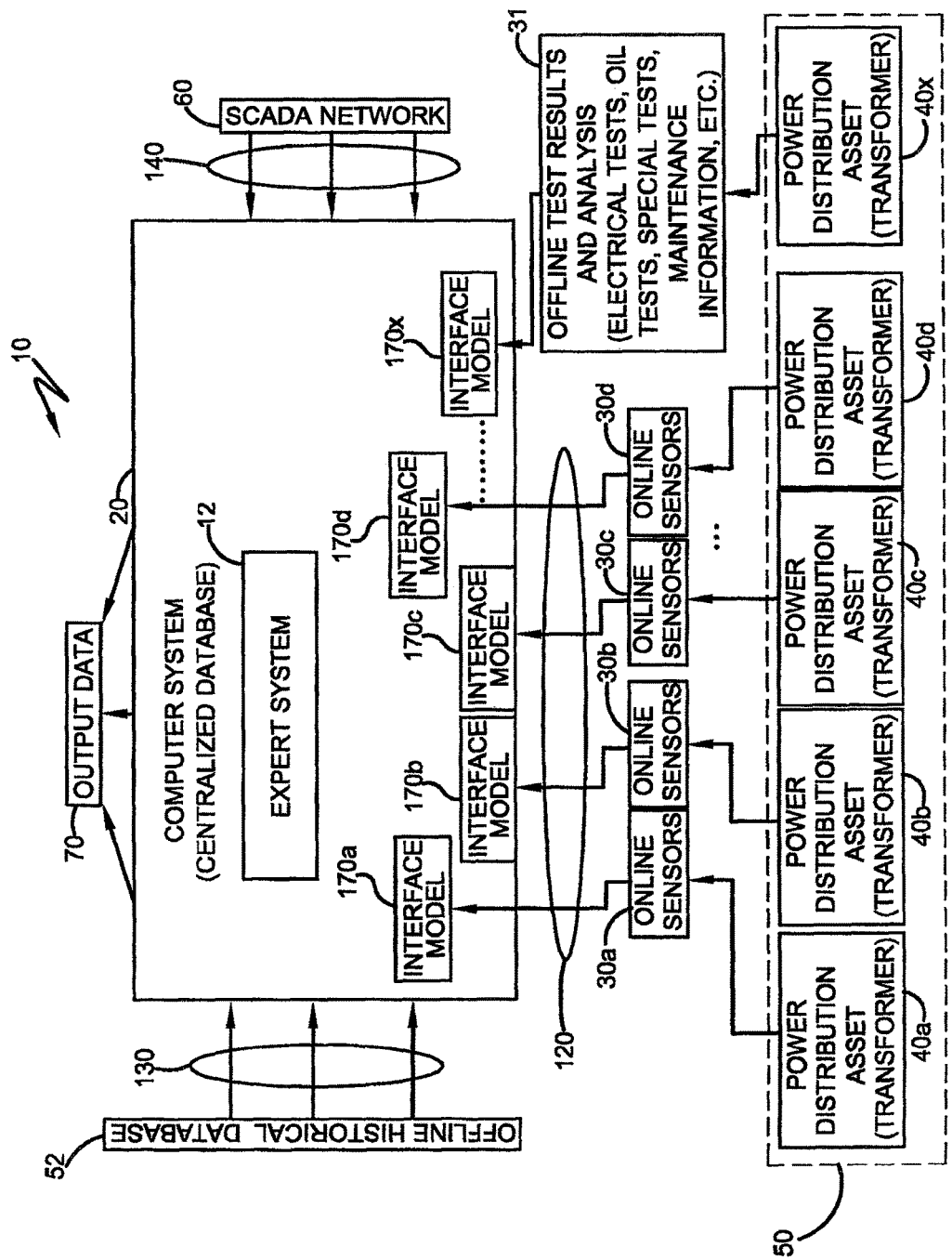

DYNAMIC ASSESSMENT SYSTEM FOR HIGH-VOLTAGE ELECTRICAL COMPONENTS

CROSS-REFERENCE TO RELATED APPLICATION

This is a § 371 application of International patent application number PCT/US2012/033433 filed Apr. 13, 2012, which claims the benefit of U.S. provisional patent application No. 61/475,852 filed on Apr. 15, 2011, and which is incorporated herein by reference.

TECHNICAL FIELD

Generally, the present invention relates to a high-voltage component assessment system. Particularly, the present invention relates to a dynamic system to assess the operating condition of high-voltage electrical components based on on-line data, off-line data, and operating data associated with the operation of the high-voltage electrical components. More particularly, the present invention relates to an assessment system that utilizes an expert system that generates recommended actions dynamically based on on-line data, off-line data, and operating data associated with the operation of high-voltage electrical components.

BACKGROUND ART

Electrical components or assets that form the high-voltage power distribution infrastructures throughout many countries is reaching an average age of 30 to 40 years old, and thus are nearing the end of the their expected operating life. As a result of the aging process, the reliability of the individual electrical components or assets is decreased, along with the availability of replacement parts needed to maintain such components in working order. However, in order to maximize their return on investment, the operators of the power-distribution infrastructure have sought to reduce the operating life cycle costs of the electrical assets by maximizing their operating capacity through increased power output and optimized maintenance budgets.

To achieve such operating goals, a substantial portion of the power distribution industry has implemented, or is in the process of adopting, next generation maintenance systems, such as condition-based maintenance systems or reliability-based maintenance systems. Such maintenance systems are configured to allow operators to strategically determine which maintenance actions to take and what investments to make in the electrical components or assets of the power distribution infrastructure based on the condition of each individual component or asset.

Additionally, over the last decade a significant number of diagnostic methods and on-line monitoring sensors/systems have been developed to assist operators of high-voltage power distribution infrastructures make informed decisions in determining what maintenance actions to take. Such diagnostic methods are typically used for off-line tests to carry out precise operating parameter assessments, while on-line monitoring systems are used to continuously monitor various operating parameters associated with the power distribution components in order to detect breaks or changes in operating trends and to trigger alarms based on the status of the monitored operating parameters.

Unfortunately, one of the difficulties for operators is that an operational outage of the electrical assets or components is required in order to conduct an off-line analysis of the operating performance of such electrical assets. Although off-line analysis methods provide accurate information, such methods are expensive to carry out and generally yield updated data periodically, such as every several months to a year or more, for example. Thus, any operating changes that take place at the power distribution assets or components are not identified by the off-line analysis system until the off-line analysis is performed. Thus, any changes that occur after an off-line analysis has taken place will not be identified until a subsequent off-line analysis is performed.

On-line monitoring sensors/systems provide continuous data relating to one specific operating performance parameter associated with the operation of each of the various electrical components or assets of the power distribution system. However, on-line sensors/systems provide data associated with only a few operating parameters and that data is less accurate than data provided by the off-line diagnostic methods. For example, on-line monitoring sensor/systems may be used to monitor the temperature of the cooling oil found in an electrical transformer tank, the bushing power factor, and on-load tap changer motor torque associated with the transformer's operation. However, because on-line monitoring sensors/systems provide limited and narrowly focused data, they are unable to provide a complete global assessment of the condition of the entire power distribution network, including the power distribution network's ability to sustain current operating conditions and the network's potential for attaining an overload condition.

Furthermore, operators of power distribution networks are generally overwhelmed with massive amounts of operating data that is difficult to interpret and manage because such data is not compiled as actionable information that can be readily interpreted by the various operational/organizational levels of the power distribution utility. Moreover, because such data is acquired from electrical components or assets of various makes and models, it is a substantial challenge to aggregate and process such data to identify relevant information which can be communicated in an appropriate format to the various members (operators) of the operational or organizational hierarchy (executive, management, maintenance) of the power distribution utility who are responsible for the operation, maintenance, and asset management of the power distribution network, which may be based in different geographical locations.

Therefore, there is a need for a dynamic assessment system for high-voltage electrical components that is configured to correlate data periodically acquired from off-line condition assessment surveys (diagnosis) with data continuously acquired from each on-line sensor to provide intelligent data outputs regarding the condition of an asset or group of assets, as well as to provide actionable information or recommended responses to the necessary operational levels of the power distribution utility so that informed decisions regarding operation and maintenance can be made. Furthermore, there is a need for a dynamic assessment system for high-voltage electrical components that provides information that will be accessible remotely by any member of the operational hierarchy of the power distribution network or utility at any time. Additionally, there is a need for a dynamic assessment system for high-voltage electrical components that dynamically and continuously updates one or more operating assessment factors, including risk of failure, overload capability, aging factor, cumulated aging time, and other operating parameters associated with a plurality (fleet) of high-voltage electrical components that are part of a power distribution network. In addition, there is a need for an assessment system for a dynamic assessment system for high-voltage components that provide a central data repository to store data that includes or that creates links to different databases having lifetime/legacy data obtained from any source (e.g. off-line records, such as diagnosis, maintenance and operation history, as well as on-line data captured by on-line sources of various manufacturers and models) related to each electrical component being monitored. Still yet, there is a need for a dynamic assessment system that provides an expert system that correlates on-line data, off-line data, and operational data of one or more electrical components with actionable information to provide a recommended response based on the current operating state of the electrical components.

SUMMARY OF INVENTION

In light of the foregoing, it is a first aspect of the present invention to provide a dynamic assessment system for high-voltage electrical components.

It is a further aspect of the present invention to provide a dynamic assessment system for monitoring high-voltage electrical components comprising at least one on-line sensor adapted to be coupled to one or more electrical components, the on-line sensors configured to generate continuous on-line operating parameter data associated with the operation of the one or more electrical components, at least one off-line database adapted to store off-line operating parameter data associated with the operation of the one or more electrical components, and a computer system in operative communication with the at least one on-line sensor and the at least one off-line database, the computer system configured to automatically and continuously correlate the on-line operating parameter data with the off-line operating parameter data, wherein the computer system generates a dynamic operating assessment or course of action that is associated with each of the one or more electrical components, the dynamic operating assessment or course of action based on the correlated on-line and off-line operating parameter data.

Yet another aspect of the present invention is to provide a method of assessing at least one high-voltage electrical component comprising providing a computer system, providing at least one on-line sensor in operative communication with the computer system and adapted to be interfaced to the at least one electrical components, providing at least one off-line database in operative communication with the computer system, acquiring at least one on-line operating parameter and at least one off-line operating parameter associated with the at least one electrical component at the computer system, correlating the at least one on-line operating parameter and the at least one off-line operating parameter, and generating a dynamic operating condition assessment or course of action from the computer system based on the correlated on-line and off-line operating parameter data.

BRIEF DESCRIPTION OF THE DRAWINGS

These and other features and advantages of the present invention will become better understood with regard to the following description and accompanying drawings wherein:

FIG. 1 is a block diagram of a dynamic assessment system for high-voltage electrical components in accordance with the concepts of the present invention.

DETAILED DESCRIPTION OF THE INVENTION

A dynamic assessment system for high-voltage electrical components or assets is generally referred to by numeral 10, as shown in FIG. 1 of the drawings. It should be appreciated that the term "electrical component(s)" or "electrical asset (s)" is defined herein as one or more (i.e. a fleet) electrical components that are part of a power generation system, power transmission network, or power distribution network, including, but not limited to, transformers, circuit breakers, switches, surge arresters, batteries, cooling systems, line and line connections, relays, or any other device. In addition, while the system 10 can be used to monitor any electrical component, the discussion that follows is directed to using the system 10 to assess the operating conditions, including the risk of failure, of electrical transformers of a power distribution network. The system 10 is configured to continuously acquire off-line operating parameter data, on-line operating parameter data, and other operating parameter data associated with the operation of the electrical components that is correlated by an expert system 12. Specifically, the expert system 12 may be embodied in hardware, software, or a combination of both, and is configured to provide information regarding the operation of one or more electrical components of a power distribution network that is formatted in a meaningful and intelligent way, along with recommended courses of action, to the various members/operators in the operational hierarchy (executive, management, operations/maintenance) of a power utility or power distribution system.

Specifically, the system 10 includes a centralized computer system 20 that is configured with the necessary hardware and software to execute the hardware and/or software components comprising the expert system 12. In addition, the centralized computer system 20 is configured to obtain online data from a plurality (i.e. a fleet) of on-line sensors 30a-d. In one aspect, the on-line sensors 30a-d may comprise any suitable make or model (i.e. type), which is configured to monitors and collects operating parameter data associated with a plurality of corresponding power distribution assets or components, such as power or electrical transformers 40a-d, that are part of a power distribution network 50. However, it should be appreciated that the system 10 may be configured to monitor operating parameters of any number of components (sensors, transformers, etc.) of the power distribution network, as previously discussed. Furthermore, the computer system 20 is hardware independent, as it is able to compatibly receive on-line data from the on-line sensors 30a-d of any make or model (i.e. type) and independently of any data protocol used by such sensors 30a-d.

In addition to acquiring on-line data, the computer system 10 also acquires off-line data from the off-line data storage system 31 that is in operative communication thereto, whereby such data stored at the storage system 31 is acquired from the off-line testing of a power distribution asset 40x. For example, the off-line data storage system 31 may comprise any suitable mass storage device or database, and is configured store any information relating to the power distribution asset 40x, such as, off-line test analysis, including electrical tests, oil tests, special tests, maintenance information, and the like. The computer system 10 is also configured to be coupled to one or more off-line databases 52 and to a SCADA (supervisory control and data acquisition) network 60 or other operating network. Specifically, the off-line databases 52 contain various data associated with the maintenance, testing, and operating performance of one or more transformers 40, or other asset, while the SCADA network 60 provides supervisory or operating data that is used to monitor the general operation of the transformers 40a-x of the power distribution network 50. The expert system 12 executed by the computer system 10 correlates the on-line operating parameter data received from the on-line sensors 30*a-d*, the off-line operating parameter data from databases 52, and the SCADA data from the SCADA network 60 to dynamically update the operating condition of each transformer 40*a-x*, or other asset, being monitored by the system 10 as output data 70 for the various members of the operational hierarchy of the power utility or power distribution network 50. In addition to providing dynamically-updated data, the expert system 12 that is executed by the system 10 correlates the dynamically acquired on-line data, off-line data, and other operating parameter data with actionable responses or recommended courses of action for operators of the power distribution network 50 in order to avoid damage to or failure of the electrical asset 40.

That is, the system 10 is configured to simultaneously monitor operating parameters of electrical transformers 40*a-d* via corresponding on-line sensors 30*a-d* and then periodically incorporate off-line data, such as various manually-performed/acquired test results associated with transformer 40*x*, from the off-line data storage system 31 or from one or more databases 52, which may include spreadsheet data or any other type of electronic data storage for example. Such data is then analyzed and processed using a correlation algorithm embodied by the expert system 12, which is configured to provide actionable output data 70 to the users of the system 10, flagging any developing issues that are associated with a corresponding transformer 40*a-x*. Depending on the type of sensors applied in a given solution, the quality of the available data may not be sufficient to provide accurate diagnostics for a given developing issue associated with the asset 40*a-x*. In addition, some data can only be acquired with the asset 40*a-x* de-energized or taken off-line. For example, insulation measurements, voltage ratios, power factor, and the like, can only be measured and stored as test results in the database 52 when the transformers 40*a-x* are taken off-line. Thus, the use of historical off-line data stored in the database 52, as well as the off-line test results provided by the off-line system storage system 31 is critical to an accurate diagnosis and analysis. Thus, the system 10 utilizes as much data as possible from the on-line sensors 30*a-d* and SCADA network 60, and from time to time, the system 10 will automatically look for that information stored at database 52 and storage system 31 and bring it into the analytical process, in order to provide actionable information 70 to the end user.

The output data 70 generated by the system 10 comprises data embodied in any suitable medium, such as an electronic medium, including, but not limited to, email messages, web pages, computer interfaces (GUI—graphical user interfaces), electronic documents, or any other medium or format, which provides data in any suitable format and at the appropriate level of granularity needed by various functional groups or stakeholders of the power distribution utility to make operating decisions regarding the operation and maintenance of the power distribution network 50. For example, the system 10 is configured to present data in a format and depth that is appropriate for the various operational members associated with the operation, maintenance, and management (e.g. CFO, CEO, Asset Manager, Maintenance Engineer, etc) of the power distribution network 50. For example, each operational or functional level in the organizational hierarchy may be provided with "dashboards" so that the CEO will see generic fleet wide information, while the maintenance engineer will see specific issues that require his or her special attention. Moreover, it should be appreciated that the output data 70 may be communicated to any suitable computing device, including handheld electronic devices or other desktop or portable computers systems or the like, in which the data 70 is presented thereon using various modes including, but not limited to electronic messaging (email, text messages, etc. . . . ), automatically updated web pages and the like. In one aspect, output data 70 may be communicated to the computing device through an enterprise local area network (LAN) using a web-like application tool.

Continuing, the computer system 20 includes an on-line interface 120, an off-line interface 130, and a SCADA (supervisory control and data acquisition) or operating interface 140. For the purpose of the following discussion, the interfaces 120-140 may comprise any suitable data communication interface, such as an ETHERNET/TCP IP port for example. Furthermore, it should be appreciated that the on-line interface 120 may utilize any suitable data protocol, such as DNP3.0, MODBUS, IEC61850, or may alternatively comprise an analog or "on-off" hard contact output, which is converted into digital data at an electrical substation gateway prior to reaching the computer system 20 where a larger database incorporates all of the on-line data. Specifically, the on-line interface 120 provided by the system 10 is configured to be coupled to and configured to receive data from one or more on-line sensors 30*a-d* that are operatively attached to each of the transformers 40*a-x* or any other asset. In one aspect, the on-line interface 120 is configured to be coupled to a plurality (i.e. fleet) of sensors 30*a-d*. The off-line interface 130 provided by the system 10 is configured to be coupled to receive data from the off-line databases 52, which may store data in any format or configuration, such as EXCEL, ACCESS, or ORACLE-based files, for example. It should be appreciated that the off-line interface 130 provided by the computer system 20 may comprise OPC (open connectivity) or SQL (sequential query logic) or by using any other suitable computer programming language or routine. In addition, the SCADA or operating interface 140 comprises sensors (not shown) that are interconnected to the substation gateway via remote terminal units (RTU) to allow the SCADA network 60 to be coupled to the computer system 10. Specifically, the operating interface 140 obtains operating data in real-time or in near real-time from the SCADA or other supervisory network 60. Such operating data includes data associated with the current operating parameters and status of the electrical components 40*a-x* being monitored by the system 10.

The on-line sensors 30*a-d* utilized by the system 10 are be configured to detect various operating parameters associated with each of the electrical assets 40*a-x*, including, but not limited to, one or more of the following: gas in the oil of transformers 40, moisture in the oil of the transformers 40, bushing conditions of the transformers 40, load tap changer LTC of the transformers 40, cooling system status and condition of the transformers 40, partial discharges (PD) associated with the transformers 40, voltage and current transients associated with the operation of the transformers 40, frequency response analysis (FRA) associated with the transformers 40 or any other device which may be incorporated in the future, collecting data which can be converted into meaningful information through the application of adequate engineering models. It should be appreciated that each transformer 40*a-x* may have one or more sensors 30 associated with it to monitor a variety of operating parameters relating to the operation of the transformer 40*a-x*.

In addition, the on-line sensors 30*a-d* and the off-line databases 52 are configured to respectively acquire on-line and off-line data, as designated below, regarding the operating parameters of the transformers 40*a-x*, such as: dissolved gas analysis (DGA, monitored on-line and off-line); standard oil tests (SOT, monitored off-line); bushing capacitance and tan-delta (monitored on-line and off-line); on-load tap changers (LTC, some operating parameters monitored on-line, some monitored off-line); insulation quality (monitored off-line) and multiple electrical tests (monitored off-line); and maintenance information (monitored off-line). Specifically, dissolved gas analysis (DGA) provides information regarding the occurrence (e.g. intensity and trend) of combustible and non-combustible gases that are dissolved in the oil of the transformers 40*a-x*, which can be correlated to various fault conditions. Standard oil tests (SOT) provide an indication of the status of the insulating oil, including its age, contamination, moisture, and other performance criteria. In addition, bushing tests identify bushing cap and tan-delta values, which are related to the status of the quality of the insulation of the bushings of transformers 40*a-x*. LTC temperature (monitored on-line) and vibration modes (monitored on-line and off-line) indicate the mechanical condition of the transformer; oil quality (monitored off-line and on-line); and contact wear (monitored on-line and off-line, which may be a major cause of transformer failure). In addition, the sensors 30*a-d* and the databases 52 may be configured to monitor other operating parameters, including but not limited to: the status of the cooling system (on-line), fans, pumps; transformer active part insulation test results (typically off-line test); turns ratios (off-line); visual/audible inspection results (on-line, however may be done by a human technician who observes certain structure details, sound levels, and leakages); and the like. In one aspect, such data may be manually summarized into a predefined report, such as a spreadsheet, off-line and stored at the database 52, whereupon it is subsequently utilized by the computer system 20.

In addition, the data obtained by the system 10 from the SCADA network 60 includes, but is not limited to, the following operating parameters associated with the transformers 40*a-x*: load (voltage/current) magnitude and phase; ambient temperature; top oil temperature; winding temperature; status of protective relays (tripped or not tripped); and various status/threshold alarms. For example, a transformer gas accumulation relay (Bucholz) maintained by the SCADA network 60 provides an indication to the system 10 that excessive combustible gases are dissolved in the cooling oil of one or more of the transformers 40*a-x*.

Thus, during operation of the system 10, the data received from the SCADA network 60, the off-line databases 52 and the on-line sensors 30*a-d* that are associated with each transformer 40*a-d* is processed by a corresponding interface module 170*a-d* maintained and executed by the computer system 20. That is, each sensor 30*a-d* utilized by the system 10 has a corresponding interface module 170*a-d* associated therewith, while the test data stored at the off-line storage system 31 is received by an associated interface module 170*x*. It should be appreciated that the interface modules 170*a-x* are utilizes an engineering or analytical model to carry out the functions discussed below.

That is, the data received from the on-line sensors 30*a-d* that monitors one or more operating parameters associated with each of the transformers 40*a-d*, or other assets, including asset 40*x* used for off-line testing is coupled to the computer system 20, is processed by corresponding interface modules 170*a-x*, which enables the computer system 20 to compatibly acquire data from each sensor 30*a-d*, and the off-line data storage system 31. Specifically, the interface modules 170*a-d* are configured as a hardware and/or software interface that corresponds to the operation of each specific type (i.e. make, model, vintage) of transformer sensor 30 that is used in the distribution network 50 and, as such, serves to enable the computer system 20 to compatibly obtain sensor data from the various sensors 30 utilized by the power distribution network 50 independently of the make, model, vintage, and data protocol used by the sensors 30. Specifically, the interface module 170*a-x* implements a large number of analytical models that incorporate predefined correlations between various monitored operating parameter input data (on-line, off-line, SCADA) and output data (response recommendations/actionable data) 70 that are defined by statistics, mathematical equations, pure expert knowledge in the form of a rule-based-system, or other logic. Specifically, the interface models 170*a-x* are configured to acquire data from each type of transformer 40*a-x*, regardless of its type. Thus, the system 10 is configured to process the on-line data received from the sensors 40*a-x* independently of its type.

For example, the interface models 170*a-x* may be configured to identify that a large amount of Acetylene gas is accumulating in the oil of one or more of the transformers 40*a-x* (system input), whereupon the interface models 170*a-x* correspondingly indicate that an electrical discharge is likely taking place inside the transformer tank (output 70). In another example, a bushing power factor processed by the interface module 170*a-x* shows a trend (input) that, as indicated by the module 170*a-x*, is likely to lead to a serious fault condition (output 70) in the near future.

Furthermore, if the off-line database 52 has not been updated for a long period of time, and the on-line data acquired from the on-line sensors 30*a-d* indicates or flags an issue, the system 10 may also recommend additional off-line tests to support a given analytical process to produce more comprehensive diagnostics.

Moreover, while individual interface models 170*a-x* are applied to specific parameter data (gas in oil, oil quality results, bushings, etc.), the global expert system 12 may also be used to compare and correlate output data of the individual interface models 170*a-x* to provide a comprehensive diagnosis regarding the operation condition of each individual electrical transformer 40*a-x* or electrical component that is part of the distribution network 50 monitored by the computer system 20. For example, the identification of a given combustible gas in the oil of a transformer 40*a-x* by the associated interface module 170*a-x* may generate an output 70 that varies from "do nothing" to a "remove electrical asset from operation" type of indication to the appropriate organizational member of the network 50. Finally, the interface module 170*a-x* analyzes the operation of a large number of operational variables associated with the operation of multiple transformers 40*a-x* (i.e. a fleet of transformers 40*a-x* or electrical components) in a very short time interval (e.g. every few minutes), which is highly desirable as it facilitates operator responsiveness.

In addition to the recommended action or response output 70 provided by the interface models 170*a-x*, the global expert system 12 implements additional engineering models (based on statistics, rule-based systems) associated with the operation of the particular electrical components 40*a-x* being monitored by the system 10 to provide further recommended responses 70 to the operators of the network 50. For example, using this correlated on-line, off-line, and SCADA data allows the expert system 12 to generate recommended actions for a particular asset 40*a-x* that has been identified as producing some type of oil leak that has been verified by a human technician during a site inspection (guided by an inspection sheet produced in accordance with the proposed solution), based on the size and characteristics of the oil leak. Small leaks may contaminate the transformers 40a-x themselves due to the presence of humidity and oxygen in the transformer oil, whereas larger leaks may result in environmental contamination that has a much higher and costly long-term impact. In another example, a particular asset 40a-x, which has been identified as having a high amount of combustible gas, which is considered damaging in most cases, may be identified as "normal" for that particular asset 40a-x, which is being monitored. Thus, the expert system 12 is configured to identify the evolution or change in the operating parameters of the electrical assets 40a-x using statistical tools, while also "learning" from the operational analysis of the operating parameters of the assets 40a-x as they change over their operating life. As such, the expert system 12 incorporates "asset experience" into the analysis using various artificial intelligence techniques, such as fuzzy logic, Bayes belief propagation networks, neural networks and/or genetic algorithm tools, and the like. The system 10 also indicates the relative deviation of operating parameters (or multiple parameters) of a specific asset 40a-x as compared to the fleet or to a family of assets that have at least one common characteristic (i.e. ratings, accessories, origin of manufacturing, etc.).

For example, at least one of the on-line sensors may be configured as a gas sensor to provide an indication that a faulty condition is developing, (i.e. a thermal fault of high temperature), which can seriously harm one or more of the electrical assets, such as the power transformer 40a-d. As such, the computer system 20 is configured to single out the combustible gases and automatically identify correlations between those gases and the load applied to the transformers 40a-d, whereby load is defined as the circulating current through the windings of the transformers 40a-d at the transformer operating voltage that is used to supply electricity as demanded by the power system. The developing fault may or may not be correlated to the load on the transformers 40a-d, but this is established to guide human operators of the network 50 on the actions to be taken to mitigate operational risk. For example, if there is a strong correlation between the increase in detected combustible gas in a given transformer 40a-d with its own load a possible recommended action produced as output of the proposed solution may be to "reduce the load of the specific transformers 40a-d as combustible gases related to thermal issues show strong correlation with load increase."

It should also be appreciated that the off-line data acquired by the computer system 20 is also used to update baseline operating conditions or operating parameters associated with the transformers 40a-x, including the risk of failure of the transformers 40a-x, that is generated by the MTMP (mature transformer management program) process described in U.S. Pat. No. 7,239,977 entitled "Method and system for systematic evaluation of evaluation parameters of technical operational equipment," incorporated herein by reference, to provide a dynamically-updated assessment (including a dynamically-updated risk of failure). In particular, the MTMP process is utilized by the computer system 20 to process off-line data from the off-line data storage system 31, such as asset fingerprint data (manufacturer, year of manufacturing, accessories, type and age, etc.), and other historical operational data found in databases 52, such as dissolved gas analysis (DGA), standard oil tests (SOT), electrical tests, maintenance procedures and history, and the like. The MTMP process produces a "static assessment" of the operational condition of each transformer 40a-x of the fleet, including a static assessment of the risk of failure of the transformers 40a-x. Specifically, while the static assessment defines the operational condition of the transformers 40a-x at a fixed point in time, the computer system 10 dynamically acquires operational experience along with new operational parameters as the transformers 40a-x continue to operate, thus forming a dynamic transformer management program (DTMP) process. Therefore, the system 10 provides on-line data as well as off-line data to the MTMP process so that it can continuously and dynamically reassess the calculations generated by the MTMP process, thus providing the user with an automated system capable of dynamically calculating risk of failure, along with other information (including operating conditions) regarding maintenance actions and operational procedures (load reduction, for example) in a dynamic manner, this is not possible with the conventional MTMP process).

In other words, the computer system 20 implements the MTMP process in a dynamic manner and utilizes the data provided from the off-line data storage system 31, databases 52, the on-line transformer sensors 30a-d, and SCADA network 60, as well as data input to the MTMP process directly. Such data includes, but is not limited to: load magnitude; quantity of gas in transformer oil; ambient temperature; top oil temperature; standard oil test results; electrical test results; transformer active part and accessories design information; bushing conditions, LTC conditions; cooling system (fans and pumps) status; and the make, model, and vintage of the various designs of the transformers 40a-x and associated accessories.

Specifically, once the MTMP process obtains the data, the computer system 30 dynamically updates a risk of failure calculation that is based on the new on-line and off-line data acquired by the computer system 20. The base line generated by the MTMP process serves as a static assessment of the "operating reference point" of the asset 40a-x and is valid only up to the moment when the data was available for the implementation of the MTMP process. The computer system 20 dynamically traces or monitors the changes which are of significance in all the monitored operating parameters (on-line data from sensors, on-line data from SCADA systems and off-line data from updated off-line databases), assessing all variables by the application of engineering models that are specific to each technical parameter, while continuously updating the calculations performed by the conventional MTMP, which was typically done statically, changing with new operational data. As such, the dynamically-implemented MTMP or DTMP is able to represent operating parameter changes that the transformers 40a-x experience over time. (For example, new and high levels of combustible gases are shown by the DTMP process but are not present when the MTMP process was executed; in addition, simple parameters, such as transformer or other asset age, which changes from one year to the next, is identified by the DTMP process, whereas the MTMP is only able to access the age of the asset or transformer on the actual date of its execution, not future dates, as is enabled by the DTMP.). Thus, the DTMP has the fingerprint data of all assets 40a-x and "knows" when age changes from the beginning of its operation and incorporates such information into the dynamic calculation, as well as in the part of the dynamic solution where age has an impact. The same application of dynamic data utilized in the DTMP process may be applied to the monitoring and analysis of other types of operating parameters and data associated with the transformers 40*a-x*, including, but not limited to, combustible gases, load, and the like.

The on-line, off-line, and SCADA operating data that has been initially processed by the computer system 20 via the MTMP process is further processed by the computer system 20 to generate various output reports or data 70 of varying depth and complexity that summarize the various data, analyses, and recommendations generated by the system 10. For example, the computer system 20 may provide a wide range of dashboards or interfaces (including interactive interfaces) having various data arrangement formats that present the output data 70 in various manners, including graphical outputs, statistical comparisons, and summaries. The computer system 20 may also include geographical locations of healthy and unhealthy transformers 40*a-x*, risk of failure charts, recommended actions to mitigate operational risk, and the like. Moreover, the computer system 20 is also able to communicate output data 70 that summarizes potential issues to operators of the power distribution network 50 using a wide range of wired and/or wireless communication modes, such as email notifications, web mail, mobile software applications, and the like, as well as using various desktop and handheld computer devices.

In addition, the generated output data 70 may be represented in a web-based type application having a graphical interface that allows one or more users to have access to the processed data 70, as well as recommended actions (actionable data) 70. The output data 70 includes, but is not limited to, bar charts with a traffic light code (percentage of good assets 40*a-x* in green, percentage of assets 40*a-x* that require some attention in yellow, and assets 40*a-x* that require immediate action in red), geographical location of the assets 40*a-x* (particularly those in yellow and red), ratings (voltage class and power class of the assets 40*a-x*, particularly those in yellow and red), calculated cost to repair, cost to replace, cost of new asset, and the like. The output data 70 may also be formatted to provide interactive charts with an interactive "drill down" function, such that a user is able to start dash boarding from an "executive" type of level that contains global information of the fleet of transformers 40*a-x* to a second level where an "asset manager" can identify developing issues, to a third level where technically-minded individuals (technicians and engineers) may inquire about specific operating parameters associated with the transformers 40*a-x*, such as levels, historical evolution, correlations, and the like. As such, the system 10 provides data at varying levels of detail and scope, based on the particular member of the utility that is reviewing the data.

It will, therefore, be appreciated that one advantage of one or more embodiments of the present invention is that a dynamic assessment system for high-voltage electrical components provides a user with direct access to information of interest, including risk of failure, overload capabilities and recommendations rather than the use of raw data to trigger alarms based on levels of specific parameters. Another advantage of the present invention is that the dynamic assessment system for high-voltage electrical components provides an open and flexible interface that is able to acquire information from various databases and that is able to integrate transformer test data from off-line databases that is stored in various formats, along with on-line data that is acquired from various types (makes/models) of on-line monitoring sensors associated with a plurality of transformers. Still another advantage of the present invention is that the assessment system for high-voltage electrical components is configured to monitor the operating condition of a plurality or fleet of electronic components.

Thus, it can be seen that the objects of the present invention have been satisfied by the structure and its method for use presented above. While in accordance with the Patent Statutes, only the best mode and preferred embodiments have been presented and described in detail, it being understood that the invention is not limited thereto and thereby.

What is claimed is:

1. A dynamic assessment system for monitoring high-voltage electrical components comprising:
   at least one on-line sensor that is coupled to one or more on-line electrical components operating with a load, said on-line sensors configured to monitor and collect on-line operating parameter data associated with the operation of the one or more on-line electrical components;
   at least one off-line database adapted to store off-line operating parameter data associated with the operation of the one or more on-line electrical components that is taken off-line, wherein said off-line operating parameter data represents off-line testing of said one or more on-line electrical components that is taken off-line and wherein said off-line operating parameter data, is acquired when said one or more on-line electrical components are de-energized for off-line testing;
   at least one off-line data storage system adapted to store historical off-line operating parameter data associated with the maintenance, testing, and operating performance of the one or more on-line electrical components;
   a supervisory control and data acquisition (SCADA) network to receive SCADA data associated with the one or more electrical components associated with said SCADA network; and
   a computer system coupled to the one or more on-line electrical components and to the one or more on-line electrical components taken off-line, the computer system in operative communication with said at least one on-line sensor, said at least one off-line database, said at least one off-line data storage system, and said SCADA network with respective data communication interfaces, wherein said on-line operating parameter data from said at least one on-line sensor and said off-line operating parameter data from said at least one off-line database are each received at said computer system through different interface models associated with respective ones of the on-line and off-line electrical components, said computer system configured to automatically and continuously correlate output from said interface models with said historical off-line operating parameter data and said SCADA data,
   wherein said computer system generates a course of action that is associated with each of the one or more online electrical components, and said course of action includes reducing the load of the one or more on-line electrical components based on said correlated output from said interface models, said historical off-line operating parameter data, and said SCADA data,
   wherein the one or more on-line electrical components operate at the reduced load in response to the course of action.

2. The dynamic assessment system of claim 1, wherein said SCADA network provides said SCADA data to said computer system in real-time.

3. The dynamic assessment system of claim 1, wherein said off-line data storage system is configured to store off-line operating parameter data associated with one or more operating parameters of the one or more electrical components which is at least one transformer, wherein said operating parameter data is selected from the group consisting of insulation measurements, voltage ratios and power factors.

4. The dynamic assessment system of claim 1, wherein said computer system is configured to generate an interactive interface that is configured to be remotely accessible by a remote computer system.

5. The dynamic assessment system of claim 1, wherein said dynamic operating assessment is selected from the group consisting of risk of failure, overload capability, aging factor, and cumulated aging time.

6. The dynamic assessment system of claim 1, wherein said computer system uses artificial intelligence to generate said recommended course of action.

7. The dynamic assessment system of claim 1, wherein said computer system is configured to be hardware independent of said on-line sensors.

8. The dynamic assessment system of claim 1, further comprising a display in operative communication to said computer system to display said recommended course of action or said dynamic operating assessment.

9. A method of assessing at least one high-voltage electrical component comprising:
providing a computer system;
providing at least one on-line sensor in operative communication with said computer system that is interfaced to at least one on-line electrical component to monitor and collect on-line operating parameter data;
providing at least one off-line database in operative communication with said computer system, said off-line database representing the off-line operating, parameter data of at least one on-line electrical component that is taken off-line;
providing at least one off-line data storage system in operative communication with said computer system, said off-line data storage system representing historical off-line operating parameter data associated with the maintenance, testing, and operating performance of said at least one on-line electrical component;
providing a supervisory control and data acquisition (SCADA) network to receive SCADA data associated with the at least one on-line electrical component associated with the SCADA network;
acquiring the on-line operating parameter data, the off-line operating parameter data, the historical off-line operating parameter data, and the SCADA data at said computer system, wherein said computer system is coupled to said at least one on-line electrical component and said at least one on-line electrical component taken off-line and the off-line operating parameter data is acquired when the at least one on-line electrical component is taken off-line and de-energized, and wherein the on-line operating parameter data and the off-line operating parameter data are each acquired through different interface models of the computer system associated with respective ones of the on-line and off-line electrical components;
correlating output from the interface models with the historical off-line operating parameter data and the SCADA data; and
reducing a load of the at least one on-line electrical component-based on said correlated output from the interface models, the historical off-line operating parameter data, and the SCADA data from said computer system.

10. The method of claim 9, further comprising:
providing a display in operative communication with said computer system; and
displaying said dynamic operating condition assessment or course of action on said display.

* * * * *